United States Patent [19]
Birkhofer et al.

[11] 4,019,845
[45] Apr. 26, 1977

[54] CONTROL SYSTEM FOR INJECTION-MOLDING MACHINE

[75] Inventors: Hans Birkhofer, Windenreute; Arno Stöhr; Werner Schrammel, both of Emmendingen, all of Germany

[73] Assignee: Klockner-Werke AG, Duisburg, Germany

[22] Filed: Apr. 21, 1976

[21] Appl. No.: 678,941

[30] Foreign Application Priority Data

May 27, 1975 Germany ............... 2523303

[52] U.S. Cl. .................. 425/146; 91/35; 91/449; 91/454; 222/334; 425/156
[51] Int. Cl.² ............. B29F 1/06; F15B 21/02
[58] Field of Search .......... 425/135, 145, 146, 155, 425/156; 91/35, 452, 454, 449; 222/334; 60/368

[56] References Cited

UNITED STATES PATENTS

| 2,789,541 | 4/1957 | Gaspar et al. ............ 91/35 |
| 3,537,356 | 11/1970 | Odell ............... 91/452 X |
| 3,695,800 | 10/1972 | Hutchinson ............ 425/146 |
| 3,840,312 | 10/1974 | Paulson ............ 425/145 X |
| 3,894,824 | 7/1975 | Wells ............... 425/146 |
| 3,911,677 | 10/1975 | Collins ............... 91/35 X |

FOREIGN PATENTS OR APPLICATIONS

| 185,044 | 9/1966 | U.S.S.R. ............... 91/452 |
| 652,360 | 4/1951 | United Kingdom ........ 425/146 |

Primary Examiner—Robert L. Spicer, Jr.
Assistant Examiner—W. R. Briggs
Attorney, Agent, or Firm—Michael J. Striker

[57] ABSTRACT

An injection-molding machine has a drive ram with a pressurizable chamber that can be connected either to the high-pressure side or the low-pressure side of a source of fluid under pressure. A control system operating this machine has a pressure-reducing valve with an inlet port connected to the high-pressure side of the source, an outlet port connected through a cut-off valve and a throttle to the chamber of the ram, and a pilot port pressurizable to control the pressure at this outlet port. A pressure-relief valve has an inlet port connected to the pressurizable ram chamber, an outlet port connected to the low-pressure side of the pressure source, and a pilot port pressurizable to control the pressure differential across this pressure-relief valve. A pressure-control valve has an outlet side connected to the low-pressure side of the source and an inlet side and is operable to maintain a first predetermined pressure differential between its inlet and outlet sides in an injection mode and to maintain a certain predetermined pressure differential between its inlet and outlet sides in a clamping mode. A check valve has one side connected to the pilot port of the pressure-reducing valve and another side connected to the pilot port of the pressure-relief valve for fluid flow only from the former to the latter. A function-control valve has a first connection coupled to the inlet side of the pressure-control valve and a second and third connection each coupled to a respective one of the pilot ports. This function-control valve is operable between a filling position connecting the pilot port of the pressure-relief valve to the pressure-control valve and an injecting/holding position connecting the pilot port of the pressure-reducing valve to the pressure-control valve.

10 Claims, 3 Drawing Figures

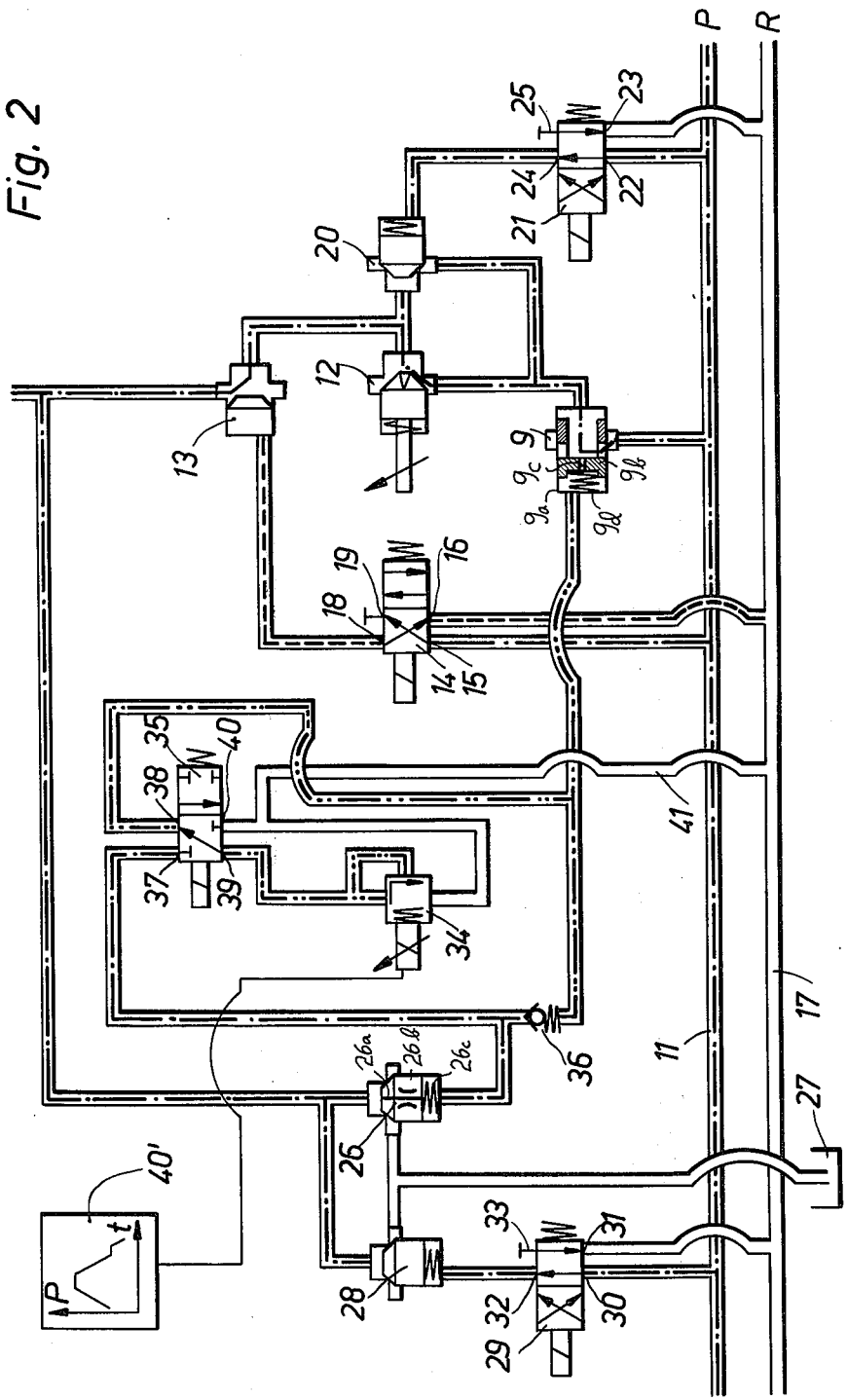

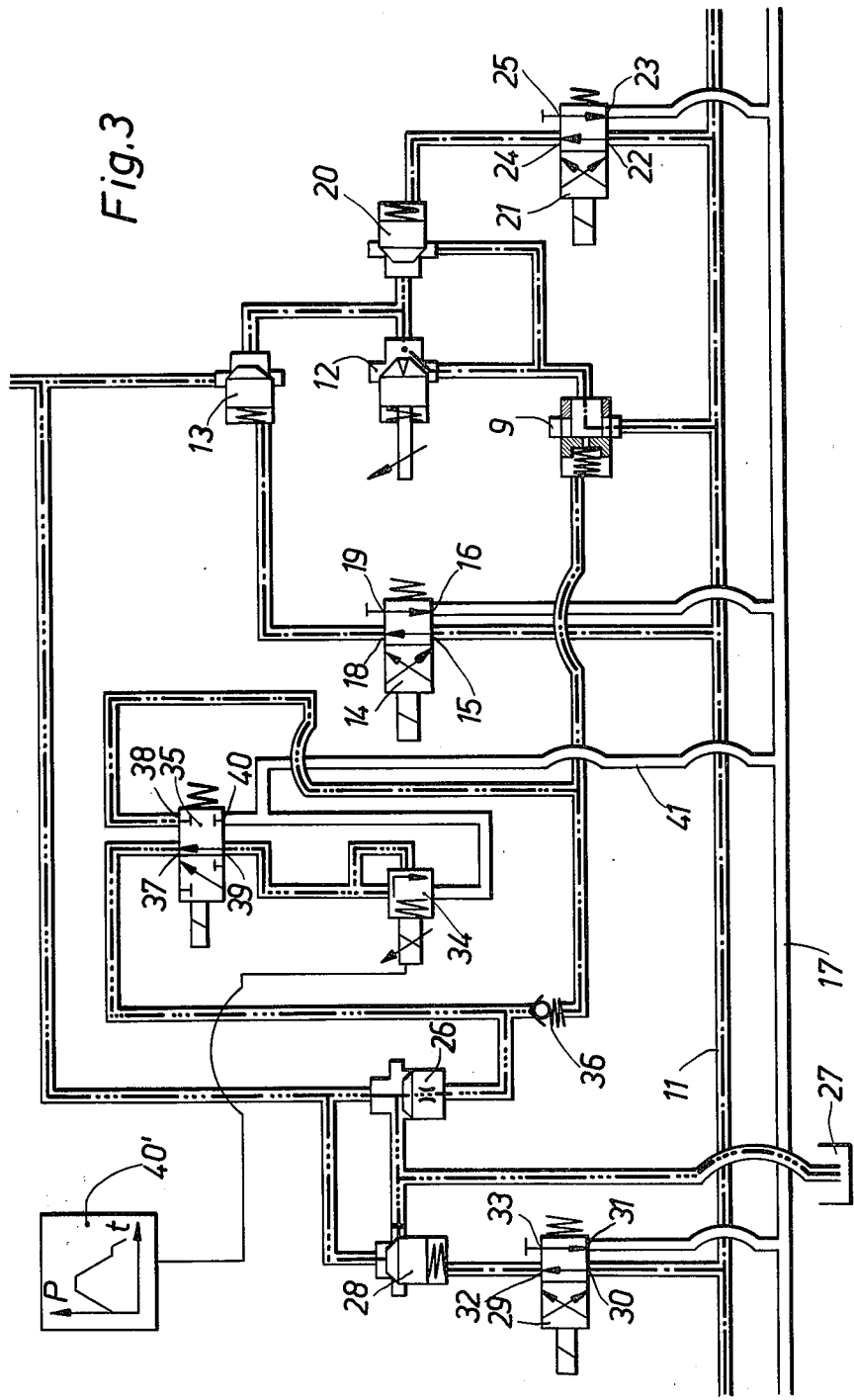

CONTROL SYSTEM FOR INJECTION-MOLDING MACHINE

BACKGROUND OF THE INVENTION

The present invention relates to a control system for an injection-molding machine. More particularly this invention concerns such a control system capable of establishing three different pressure levels in the ram operating such a machine.

An injection-molding machine has a plastifying screw rotatable and reciprocal in a housing. One end of the housing is formed with an injection head having an orifice through which plastified synthetic-resin material is ejected under pressure into a mold and the other end of the housing is provided with a laterally opening filling orifice to which granulated synthetic-resin material is chargeable.

During a normal molding cycle the granulated and unplastified synthetic-resin material is loaded into the back end of the injection-molding machine as the worm is rotated and the housing of the machine is heated. Thus the rotating worm acts as an auger and tries to force the material forwardly in the housing. Since at the beginning of the operation the forward end of the housing is closed, however, this has the effect of slowly driving the worm backwardly against the force of a ram. During this part of the cycle a relatively low pressure is maintained in the working chamber of the ram so that the ram can be forced backwardly but the plastified mass is maintained under pressure.

Once the injection-molding machine chamber is filled the pressure is greatly increased to a so-called injection pressure in the ram operating the worm. This forces the worm forward, piston-fashion to extrude the plastified synthetic-resin material from the end of the machine.

It has been found that for best molding results it is essential in the last portion of the forward advance of the worm to change the pressure from the ejecting pressure to a so-called compacting or holding pressure. It is essential for best molding results that the injecting pressure and the holding pressure be maintained within very narrow ranges, and that the change-over from the one pressure to the other be effected at a very carefully controlled and ascertained instant.

In order to operate the ram of the injection-molding machine at these three different pressure levels it is necessary to provide a programming device normally incorporating a timer operating by means of limit means carried on the injection-molding machine. All such programming arrangements have proven themselves unsatisfactory in use in that they were unable to react with sufficient speed to change over, for instance, from the injection to holding pressure at just the right instant, or the various ranges changed with time or temperature due to sensitivity of the electronic components.

SUMMARY OF THE INVENTION

It is therefore an object of the present invention to provide an improved injection-molding system.

Another object of this invention is an improved controlled system for an injection-molding machine of the above-described mode of operation.

These objects are attained according to the present invention in an injection-molding machine having a drive ram with a pressurizable chamber and with a source of a fluid under pressure having a high-pressure side and a low-pressure side. The control system for this arrangement comprises a pressure-reducing valve having an inlet port connected to the high-pressure side of the source, an outlet port connected to the chamber and a pilot port pressurizable to control the pressure reduction across this valve. A pressure-relief valve has an inlet port connected to the chamber of the ram, an outlet port connected to the low-pressure side of the source, and a pilot port which is pressurizable to determine the pressure differential across the pressure-relief valve, as the pressure at its outlet port is always substantially zero. A pressure-control valve has an outlet side connected to the low-pressure side of the pressure-relief valve and an inlet side connected to a function control valve. This pressure-control valve is operable to maintain a first predetermined pressure differential between its inlet and outlet sides in an injecting mode and to maintain a second predetermined pressure differential between these inlet and outlet sides in a clamping mode. A function-control valve has a first connection coupled to the inlet side of the pressure-control valve and second and third connections each coupled to a respective one of the pilot ports of the pressure-reducing and pressure-relief valves. This function-control valve is operable between a filling position connecting the pilot port of the pressure-relief valve to the pressure-control valve and an injecting/holding position in which it connects the pilot port of the pressure-reducing valve to the pressure-control valve. This pressure-control valve can be connected to the pilot port of the pressure-reducing valve to establish the injecting and holding pressures in the chamber of the ram. Alternately it can be connected to the pressure-relief valve in order to control the filling pressure of the chamber of the ram. With such a hydraulic control system the reaction time is virtually instantaneous so that the change-over from injecting to holding pressure can take place at exactly the right instance as can the change-over from filling pressure to injecting pressure.

A programmer is connected to the function-control valve and to the pressure-control valve so as to pressurize the pilot ports of the pressure-reducing valve and the pressure-relief valve at the appropriate instant to the appropriate level for the desired filling, injecting, and holding pressures in the ram chamber.

According to further features of this invention the system is provided with a second pressure-reducing valve or a throttle and a cut-off valve between the outlet side of the pressure-reducing valve and the chamber. The shut-off valve may be constituted as a three-way or four-way operating valve connected to the pilot port of a piston-type cut-off valve. This operating valve is itself controlled by a programmer so as completely to shut off fluid flow from the pressure-reducing valve to the ram chamber during the filling interval. According to this invention a shunt valve, comprises another three-way or four-way valve operating a piston-type cut-off valve is connected in shunt across the throttle between the pressure-reducing valve and the ram chamber in order to allow for very fast displacement of the injection screw in the forward direction if desired.

In accordance with yet another feature of this invention, a shunt valve comprising a piston-type cut-off valve operated by a three-way or four-way operating valve is also connected across the pressure-relief valve in order to allow the chamber of the injection ram to be emptied very rapidly if desired.

With the arrangement according to the present invention a check valve is provided between the pilot ports of the pressure-relief and the pressure-reducing valve. This check valve inhibits fluid flow from the pressure-reducing valve pilot port to the pressure-relief valve pilot port. Thus the pressure applied to the pilot port of the pressure-reducing valve will always be at least as large as the pressure applied to the pilot port of the pressure relief valve. According to another feature of this invention, the pressure-reducing valve and the pressure-relief valve each have a housing subdivided by a reciprocal piston into a pair of compartments one of which has the pilot port and the other of which has the other ports of the respective valve. Each such piston has a small diameter orifice permitting limited fluid leakage between the two compartments. This insures pressurization of the control network.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawings.

BRIEF DESCRIPTION OF THE DRAWING

FIG. 2 is a schematic view similar to FIG. 1 illustrating the control system during the injection and holding parts of the operations; and FIG. 3 is a view similar to FIGS. 1 and 2 illustrating the system during the filling operation.

DESCRIPTION OF THE PREFERRED EMBODIMENTS

Figure 1:
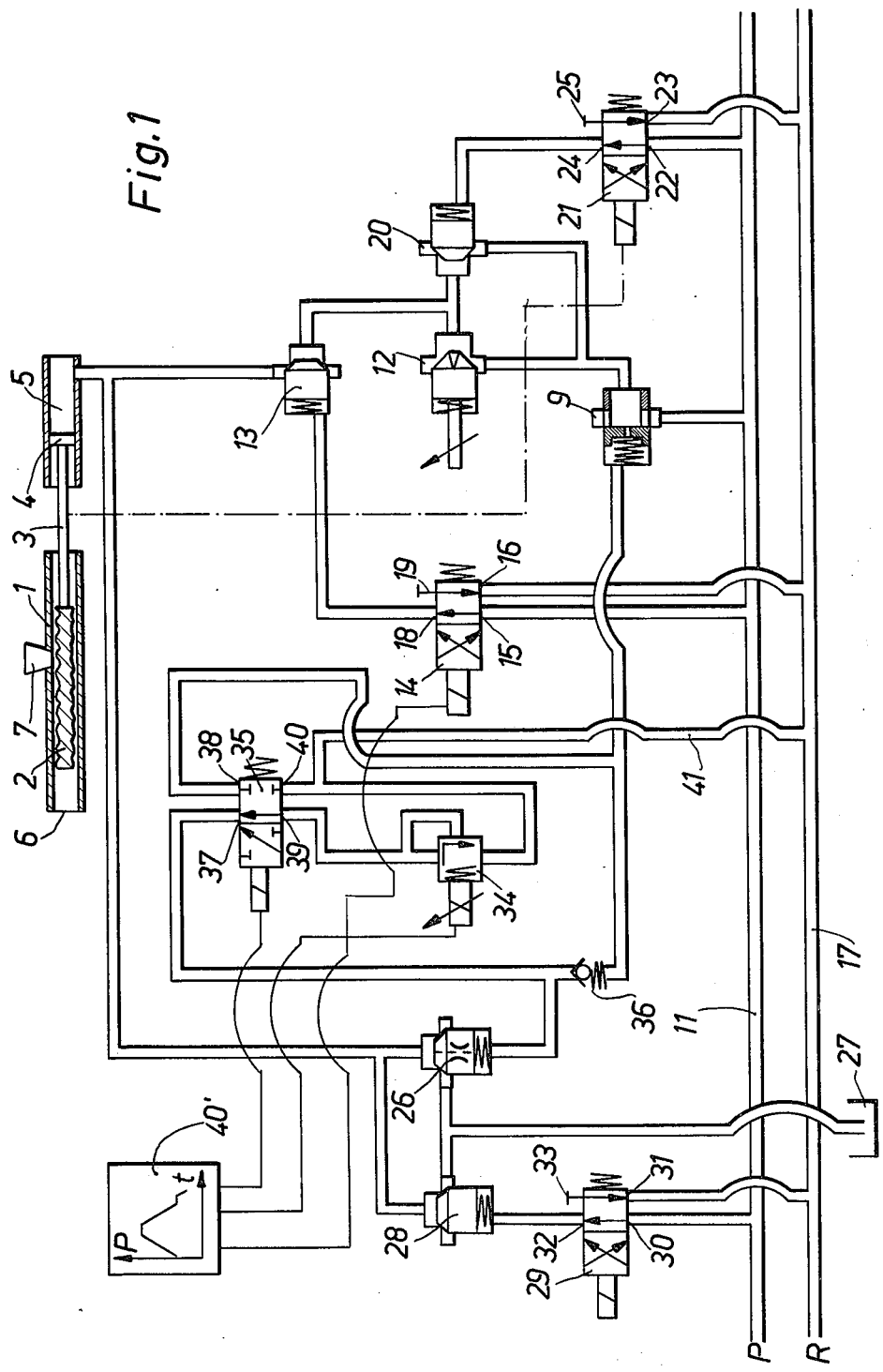
FIG. 1 is a schematic view of the system according to the present invention.

As shown in FIG. 1 an injection-molding machine basically comprises a cylindrical housing 1 in which is rotatable and reciprocal a screw 2 connected via a shaft 3 to a piston 4 itself slidable in a pressurizable chamber 5. Synthetic-resin material can be extruded from the left-hand end 6 of the housing 1 by pressurization of the chamber 5 to advance the worm 2 piston-fashion in the housing 1.

During a normal molding operation the rotating worm 2 is held adjacent the front end 6 of the housing 1. Granulated synthetic-resin material is fed in via the funnels 7 upstream of the worm 2 which is rotated continuously by a drive (not shown). Relatively low pressure, the so-called back pressure, is maintained in the chamber 5 behind the piston 4 so that the rotating ram 2 will be urged toward the end 6. This pressure is nevertheless relatively low so that as the rotating worm plastifies the material and forces it toward the end 6 it is displaced backwardly in the housing 1. Once the rotating worm 2 is all the way at the back end of the housing 1, the pressure in the chamber 5 is increased considerably to the so-called injecting pressure. This forces the worm 2 forwardly to inject the plastified synthetic-resin material from the end 6 into a mold. Shortly before the worm 2 reaches the end 6 the pressure in the chamber 5 is changed to the holding or compaction pressure and the cycle is completed. It is essential that the change-over from injection to clamping pressure take place at a given instant, and that each of the pressures remain relatively constant when they are effective.

As further shown in FIG. 1 the basic system according to the present invention has a pressure line 11 and an exhaust or return line 17. The pressure in this line 11 is relatively high and constant and the pressure in the line 17 is virtually zero. The line 11 is connected to a pressure-reducing valve 9 of the piston type having an output connected to a spring-loaded adjustable throttle valve 12. The output of this valve 12 is connected to a simple piston-type cut-off valve 13 whose output in turn is connected to the chamber 5. This cut-off valve 13 has a pilot compartment connected to a working port 18 of a four-way valve 14. The other working port 19 of this four-way valve 14 is blocked off and the pressure and return ports 15 and 16, respectively, are connected to the pressure and return lines 11 and 17. Blocking off of the working port 19 thus effectively makes the valve 14 into a three-way valve. It is thus apparent that the chamber 5 can be pressurized by the line 11 through the valves 9, 12 and 13.

It is also possible for the pressure in the chamber 5 to drain off via a pressure-relief valve 26 having an outlet side connected to a reservoir 27 functionally equivalent to the return line 17. The pilot port of this pressure-relief valve is connected to a working port 37 of a four-way valve 35 whose other working port 38 on the same side is connected to the pilot port of the pressure-reducing valve 9. A check valve 36 is provided between the ports 37 and 38 to allow flow from the port 37 connected to the pressure-relief valve pilot port 26 to the pilot port of the pressure-reducing valve 9. On the other side of the valve 35 one port 39 is connected to a remotely controlled pressure-control valve 34 connected via a conduit 41 to the return line 17. The other port 40 of this valve 35 on this side is effectively tied off although for ease of connection the line 41 is coupled thereto. Thus this valve 35 also effectively functions as a three-way valve.

A programmer 40' is connected to the pressure-control valve 34 to the valve 35, and to the valve 14.

Connected in shunt across the throttle valve 12 is a piston-type cut-off valve 20 identical to the valve 13 and operated by a four-way valve 21 having a pressure port 22 and an exhaust port 23 respectively connected to the lines 11 and 17 and a pair of working ports 24 and 25, the former being connected to the pilot port of the piston-type spring-loaded cut-off valve 20 and the latter being tied off so as to make the valve 21 effectively a three-way valve. This valve 21 is operated by a limit switch carried on the rod 3 so as either to move from the position illustrated in FIG. 1 after displacement of the worm beyond a predetermined position or to move back into this position on such displacement. This cut-off valve assembly 20, 21 therefore serves to by-pass the throttle valve 12 so as greatly to increase the speed at which the worm 2 can be advanced to effect a fast/slow or slow/fast piston stroke as is required in some molding operations.

Also connected in shunt across the pressure-relief valve 26 is another such cut-off valve 28 operated by a four-way valve 29 having pressure and exhaust ports 30 and 31 connected to the lines 11 and 17 and working ports 32 and 33 connected to the pilot port of the cut-off valve 28 and tied off, respectively. Displacement of the valve 29 from the position illustrated in FIG. 1 to the right opens the valve 28 and allows pressure inside the chamber 5 to be bled off at a much faster rate than would otherwise be possible for rapid withdrawal of the worm 2 when required.

It is noted that the entire hydraulic circuit shown in FIG. 1 is mounted in a single block right on the injection-molding machine. In fact, the spools of the two valves 14 and 35 may be rigidly interconnected and operated by a single solenoid in one direction with a single spring urging them in the opposite direction. Thus it is possible to make a very rigid and leak-proof assembly for controlling the operation of the worm 2.

FIGS. 2 and 3 illustrate the operation of the above-described hydraulic control system. The various pressures are illustrated schematically by the types of lines in the various conduits. A simple dashed line (-----) indicates the minimum pressure at the inlet side of the pump or at the reservoir of the system, a dash triple-dot (-...-...-) line is the pressure in the cylinder during filling of the molding machine, a dash double-dot (-..-..-) line indicates the control pressure for the valve 9, and a dot-dash (-.-.-) line is the highest pressure in the system corresponding to the high-pressure side of the pump, the holding pressure, or the injecting pressure. The control pressure is greater than the back pressure and the holding or injecting pressure is higher than the control pressure.

As shown in FIG. 2, during injection and holding the chamber behind the piston of the cut-off valve 13 is connected to the return line so that this valve 13 will be fully opened. Thus it is possible for pressure to flow from the line 11 through the control valve 9, the throttle valve 12 and the open cut-off valve 13 to the chamber 5. The pressure will be determined by the pressure-reducing valve 9 which has a housing 9a subdivided by a piston 9b into a pair of chambers. An orifice 9c through the piston allows limited fluid flow between the chambers and a spring 9d urges the piston 9b in a direction tending to increase fluid flow between the inlet and outlet side.

Thus it should be apparent that if the pilot port of the valve 9 is blocked off pressure will bleed through the orifice 9c and equalize pressure on both sides of the piston 9b, allowing the spring 9d to push the piston 9b to the right in FIG. 2, therefore opening the valve 9 up altogether and allowing maximum pressure to flow through this valve 9. The pilot port of the valve 9 is, however, supplied with fluid under pressure by displacement of the valve 35 through the controller 40' such that the port 38 connected to the pilot port of the valve 9 is connected to the inlet side of the pressure-control control valve 34. The programmer 40' is, as described above, also connected to this pressure-control valve 34 and serves to maintain a pressure at the pilot port of the valve 9 which ensures the proper injecting pressure during injection, and automatically changes this pressure at the pilot port to the appropriate pilot pressure for obtaining the requisite holding pressure in the chamber 5.

During injection and holding the pilot pressure shown by the dash double-dot line in FIG. 2 cannot be effective through the check valve 36 on the pressure-relief valve 26. Since this pressure-relief valve 26 has a small-diameter restricted passage 26a in its piston 26b the pressure will after a brief interval be equal on both sides of the piston 26b so that the spring 26c of this valve 26 will close it completely. Thus the pressure-control valve 34 which controls the pilot pressure for the pressure-reducing valve 9 and pressure relief valve 26 sets the levels of the holding pressure and the injecting pressure as well as back pressure.

During the clamping operation it is possible to operate the worm 2 with increased speed by actuation of the four-way valve 21 so as to open the cut-off valve 20 and bypass the throttle 12.

As shown in FIG. 3 during the filling of the injection-molding machine, as the screw rotates and is pushed backwardly by the plastified synthetic-resin material, the valves 14 and 35 are in the position indicated in FIG. 3. In this position the valve 14 connects the shut-off valve 13 to the high-pressure line 11 so as to close this valve 13 and absolutely prevent fluid flow through the series-connected valves 9, 12 and 13. Even opening of the valve 20 in this position will be completely ineffective to feed fluid under pressure to the chamber 5.

The valve 35 is effective during the filling of the injection-molding machine to connect the pilot port of the pressure-relief valve 26 to the pressure-control valve 34. The programmer 40' is effective to set the pilot pressure for the relief valve 26 so that a relatively low pressure is maintained in the chamber 5 and the worm 2 can back up. Opening of the pressure-relief valve 26 allows excess pressure in the chamber 5 to drain off into the reservoir 27, although instead of reservoir 27 the output side of this valve 26 could be connected to the return line 17, the return line 17 and the reservoir 27 constituting effectively the low-pressure side of the pressure source whose high-pressure side is the line 11. During this part of the operating cycle, the pilot pressure effective against the back side of the check valve 36 grows to be substantially equal to the pressure in the line 11. The valve 36, however, prevents this pressure from being effective at the pilot port of the pressure-relief valve 26.

During filling it is possible to operate the valve 29 so as to open the cut-off valve 28 to bypass the pressure-relief valve 26 and allow extremely rapid backing of the piston 4.

It will be understood that each of the elements described above, or two or more together, may also find a useful application in other types of systems differing from the types described above.

While the invention has been illustrated and described as embodied in a control system for an injection-molding machine, it is not intended to be limited the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. In combination with an injection-molding machine having a drive ram with a pressurizable chamber and with a source of fluid under pressure having a high-pressure side and a low-pressure side, a control system comprising: a pressure-reducing valve having an inlet port connected to the said high-pressure side, an outlet port connected to said chamber, and a pilot port, means operable in said pressure-reducing valve whereby the pressure at said pilot port determines the pressure at said outlet port; a pressure-relief valve having an inlet port connected to said chamber, an outlet port connected to said low-pressure side, and a pilot port, means operable in said pressure-relief valve whereby the pressure at said inlet port of said pressure-relief valve is determined by the pressure at its said pilot port; a pressure-control valve having an outlet side connected to said low-pressure side and an inlet side and having means operable to maintain a first predetermined pressure differential between said inlet and outlet sides in an injecting mode and to maintain a second predermined pressure differential between said inlet and outlet sides in a clamping mode; and function-control means including a valve having a first connection coupled to said inlet side and second and third connections each coupled to a respective one of said pilot ports and operable between a filling position connecting said pilot port of said pressure-relief valve to said pressure-control valve and an injecting/holding position connecting said pilot port of said pressure-reducing valve to said pressure-control valve.

2. The system defined in claim 1, further comprising a cut-off valve between said outlet port of said pressure-reducing valve and said chamber, said cut-off valve being closable to block fluid flow from said pressure-reducing valve to said chamber and openable to permit such flow.

3. The system defined in claim 2, further comprising a second pressure-reducing valve connected in series with said cut-off valve between said outlet port of said pressure-reducing valve and said chamber.

4. The system defined in claim 3, further comprising a shunt valve connected across said second pressure-reducing valve, said shunt valve being openable to bypass said cut-off valve.

5. The system defined in claim 1, further comprising a shunt valve connected across said pressure-relief valve, said shunt valve being openable to bypass said pressure-relief valve.

6. The system defined in claim 1, further comprising a program means connected to said function-control means and to said pressure-control valve for operating said function-control means to connect said pilot port of said pressure-reducing valve to said pressure-control valve and thereupon switching same from said injecting position to said holding position after a predetermined interval.

7. The system defined in claim 6, further comprising a cut-off valve connected between said outlet port of said pressure-reducing valve and said chamber, said cut-off valve being openable to permit fluid flow from said pressure-reducing valve to said chamber and closable to block said flow, said program means being connected to said cut-off valve to close same on connection of said pressure-control valve through said function-control means to said pressure-relief valve.

8. In combination with an injection-molding machine having a drive ram with a pressurizable chamber and with a source of fluid under pressure having a high-pressure side and a low-pressure side, a control system comprising: a pressure-reducing valve having an inlet port connected to said high-pressure side, an outlet port, and a pilot port pressurizable to control the pressure at said outlet port; a cut-off valve between said outlet port and said chamber openable for fluid flow therebetween and closable to block such flow; a throttle between said cut-off valve and said pressure-reducing valve; a pressure-relief valve having an inlet port connected to said chamber, an outlet port connected to said low-pressure side, and a pilot port pressurizable to control the pressure differential across said inlet and outlet ports of said pressure-relief valve; a pressure-control valve having an outlet side connected to said low-pressure side and an inlet side and openable to maintain a first predetermined pressure differential between said inlet and outlet sides in an injecting mode and to maintain a second predetermined pressure differential between said inlet and outlet sides in a clamping mode; a check valve having one side connected to said pilot port of said pressure-reducing valve and another side connected to said pilot port of said pressure-relief valve and for fluid flow only from the former to the latter; and a function-control valve having a first connection coupled to said inlet side and second and third connections each coupled to a respective one of said pilot ports and operable between a filling position connecting said pilot port of said pressure-relief valve to said pressure-control valve and an injecting/holding position connecting said pilot port of said pressure-reducing valve to said pressure-control valve.

9. The combination defined in claim 8 wherein said pressure-relief valve and said pressure-control valve each have a housing and a piston subdividing same into a pair of compartments one of which has the respective pilot port and the other of which has the other ports of the respective valve, each piston being formed with a small-diameter orifice permitting limited fluid flow between the respective compartments.

10. The combination defined in claim 8 wherein said function-control valve is a four-way valve having a port constituting a fourth connection and unable to communicate with any of said first, second, or third connections.

* * * * *